July 17, 1934.　　　　H. E. McCRERY　　　　1,967,097
WATER MEASURING AND SUPPLYING DEVICE FOR MIXERS
Filed March 23, 1931　　　3 Sheets-Sheet 2
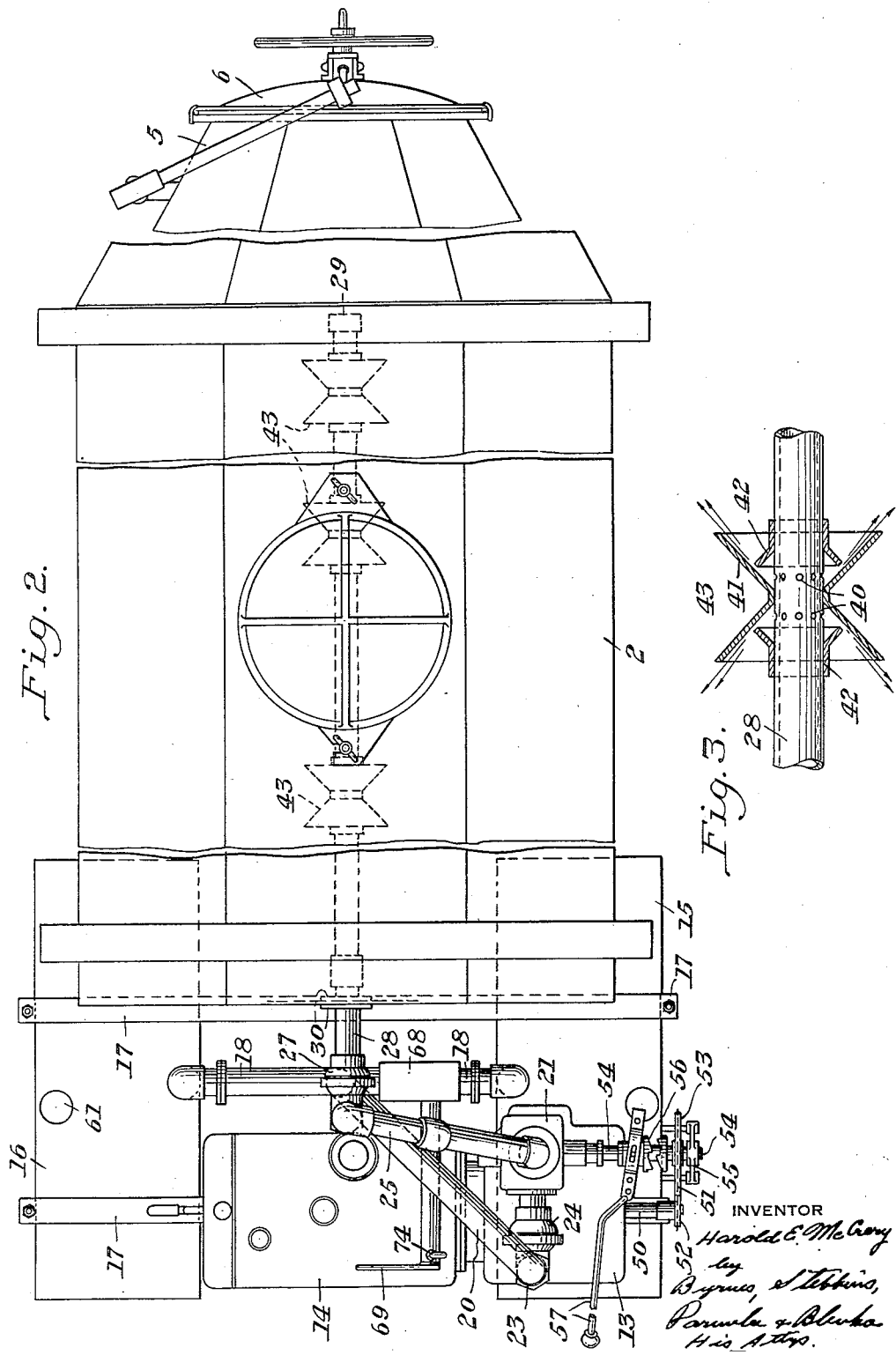

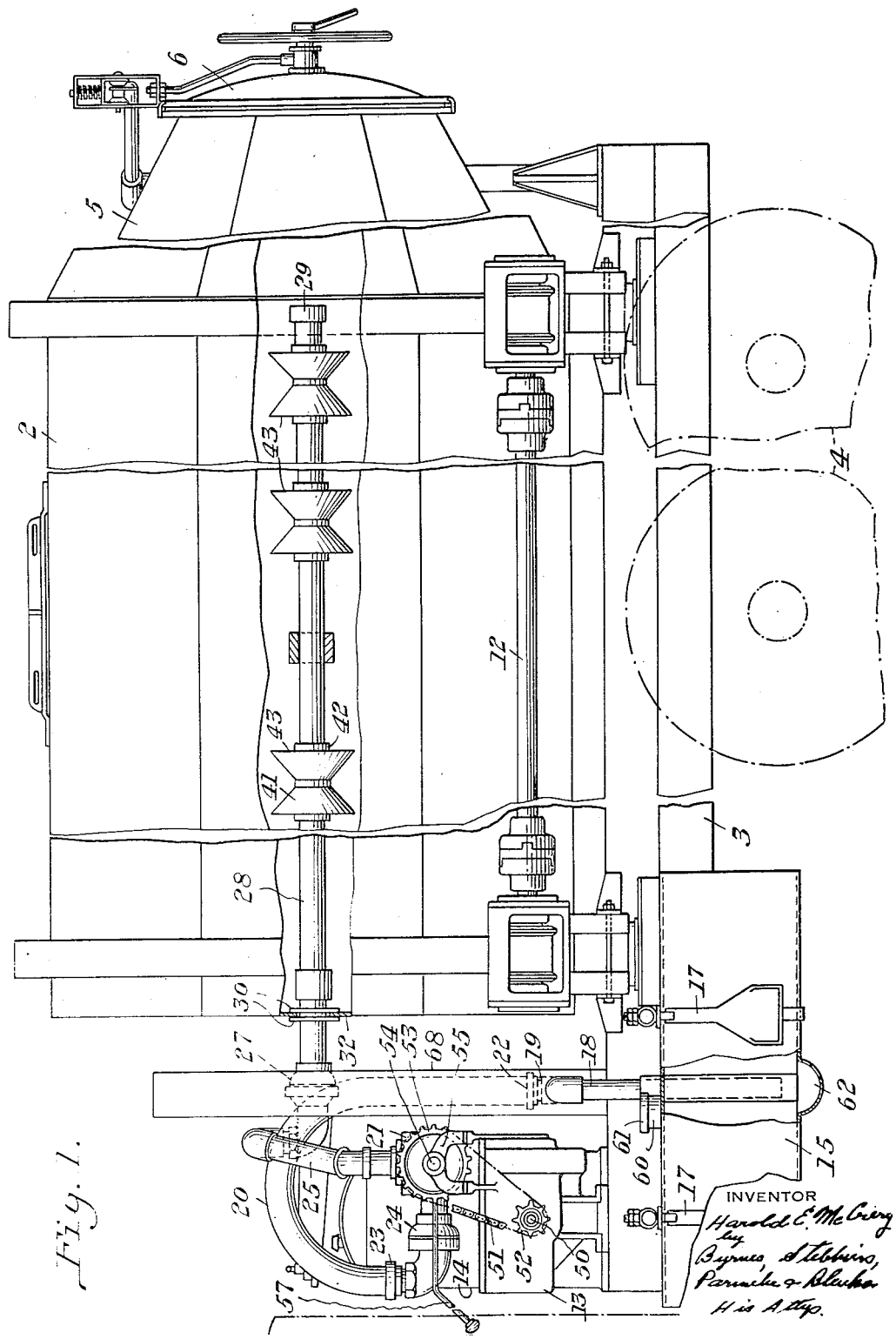

July 17, 1934. H. E. McCRERY 1,967,097
WATER MEASURING AND SUPPLYING DEVICE FOR MIXERS
Filed March 23, 1931 3 Sheets-Sheet 3
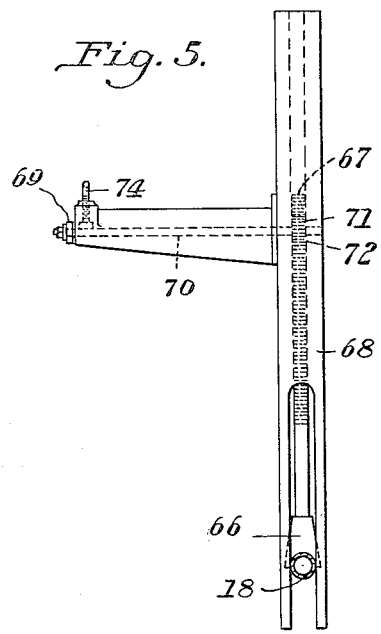
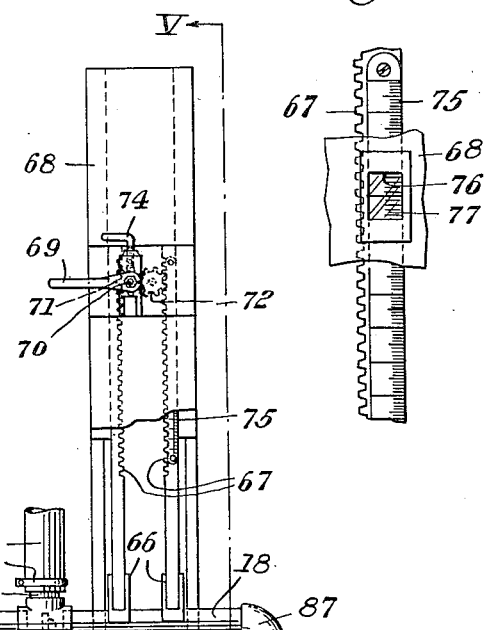
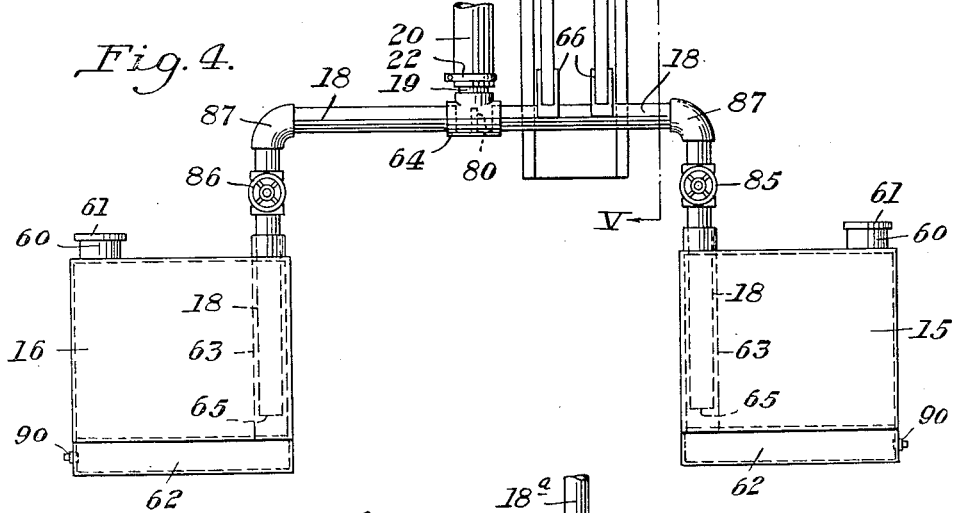
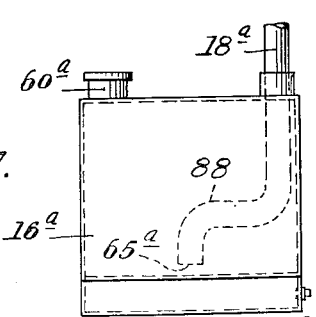
INVENTOR
Harold E. McCrery
by
Byrnes, Stebbins Parmelee & Blenko
His Attys.

Patented July 17, 1934

1,967,097

UNITED STATES PATENT OFFICE 1,967,097

WATER MEASURING AND SUPPLYING DEVICE FOR MIXERS

Harold E. McCrery, Pittsburgh, Pa., assignor to Blaw-Knox Company, Blaw-Knox, Pa., a corporation of New Jersey Application March 23, 1931, Serial No. 524,507

4 Claims. (Cl. 83—73)

This invention relates generally to mixers for mixing cement, concrete or other material, and more particularly to water measuring and supplying devices for measuring and supplying the water to the material in a rotatable mixer.

In the accompanying drawings, which illustrate two embodiments of my invention,

Figure 1 is a side elevation of a truck mixer embodying my invention, parts being broken away to show the spray nozzles;

Figure 2 is a plan view of the apparatus shown in Figure 1, parts being broken away;

Figure 3 is a detail sectional view showing a spray nozzle used for spraying water into the mixer;

Figure 4 is a front elevation of the apparatus shown in Figure 1, as viewed from the left-hand end of the drum shown in Figure 1, certain parts being omitted for clearness;

Figure 5 is a section taken on the line V—V of Figure 4;

Figure 6 is a detail front elevation of the rack shown in Figures 4 and 5 and illustrating the scale which indicates the amount of water which can be withdrawn from the water tank at that particular setting of the rack; and Figure 7 is a partial view similar to Figure 4, but illustrating the inlet opening of the suction pipe as located at the longitudinal center line of the water tank.

The devices for measuring and supplying water to a mixer are described herein as applied to a mixer mounted on a truck chassis, although certain features of the invention also are applicable to a mixer mounted for rotation on a stationary base.

It has been proposed heretofore to provide truck mixers with water tanks which feed water by gravity to the charge of material in the mixer. In order to insure that the water will flow from the tank or tanks into the mixer by gravity, it is necessary to arrange the tanks at a considerable elevation above the mixer inlet opening. The amount of headroom available for elevating the tanks is limited in a truck mixer so that it is not practical to elevate the tanks to a distance such that the action of gravity will be sufficient to spray the water under considerable pressure into the mixer. In order to accomplish a thorough mixing of the material, it is advisable to spray the water under considerable pressure, and as has been stated above, this is not practical when gravity means alone is employed.

According to the present invention, the water is sprayed from nozzles disposed in the mixer, and the pressure necessary for spraying the water is obtained by arranging a pump in the connections between the water tank or tanks and the mixer. The water tank is preferably secured to the truck chassis at a convenient point so that its outlet opening is below the inlet opening of the mixer. Since a pump is employed for forcing the water from the tank to the mixer, it is not necessary to locate the tank above the mixer, and this results in an arrangement whereby the tank or tanks can be disposed at any convenient place on the truck chassis. The pump preferably is driven from an engine separate from the engine which moves the truck, but, if desired, the truck engine may be employed by using suitable operating connections.

Referring more particularly to the accompanying drawings, the mixing apparatus comprises a mixing drum or mixer 2 which is mounted on the chassis 3 of a truck having wheels 4. By mounting the mixer on a truck, the mixing can take place while the charge is being hauled to the place where it is to be used. The rear end 5 of the mixer is closed by a cover 6 which is operated by the mechanism shown in Figures 1 and 2. The details of this mechanism are not described in the present application as it forms no part of the present invention and is intended to be claimed in an application to be subsequently filed.

The mixer is rotated through a shaft 12 and suitable connections (not shown) between it and transmission mechanism enclosed in a casing 13 mounted on the chassis. The transmission mechanism within the casing 13 is driven by an engine 14 disposed adjacent the transmission mechanism. The connections between the transmission mechanism within the casing 13 and the drive shaft 12 are not shown herein, as it is not necessary to an understanding of the present invention, and because it is desired to cover it in a separate application. The arrangement between the transmission mechanism and the shaft 12, however, is such that the mixer 2 may be rotated first in one direction and then in the other. This results in a bodily motion of the mass in process of mixing within the drum first towards one end of the drum and then towards the other. This motion of the mass first towards one end of the drum and then towards the other results, in connection with the spraying of water as hereinafter more fully described, in a very thorough mixing of the contents of the drum.

The water which it is desired to introduce into the mixer is contained in two tanks 15 and 16 secured to the opposite sides of the truck chassis by means of straps 17. The tanks 15 and 16 are arranged below the water inlet of the mixer. Extending into each of the tanks 15 and 16 is a branch conduit 18 which connects with a riser or main conduit 19 which is connected by a flexible conduit 20 shown in Figures 1 and 2 to a pump 21. Couplings 22 and 23 and a universal joint 24 are used in making the connections between the pump 21 and riser 19. The water flows through the pump 21, conduit 25, and universal coupling 27, into a discharge pipe 28 extending into the mixer 2 and disposed axially thereof. The pipe 28 is closed at its right-hand end 29, as viewed in Figure 1, and suitable packing rings 30 are used to close the opening between the pipe and front end 32 of the mixer.

The pipe 28 is provided with spaced sets of openings 40 extending through the wall of the pipe. Mounted on the outside of the shaft 28 adjacent each set of openings 40 is a spool-shaped deflecting member 41 which deflects the water sprayed through the openings 40 in the directions indicated by the arrows in Figure 3. Collars 42 also are clamped to the outside of the pipe 28 to insure accurate spraying of the water in the desired directions, the members 41 and collars 42 constituting nozzles indicated generally by the reference numeral 43.

The pump 21 which delivers water to the spray nozzles is driven by the engine 14 which operates through transmission gearing (not shown) within the casing 13 to drive a shaft 50. A sprocket chain 51 passes around a sprocket wheel 52 secured to the shaft 50 and around a sprocket wheel 53 on a shaft 54 which is connected to the rotor of the pump 21. The shaft 54 has a bearing in a bracket 55. Connection is made between the shaft 50 and the shaft 54 by means of a dog clutch 56 operated through a handle 57 which extends near to the driver's seat. When it is desired to draw water from the water tanks 15 and 16, it is necessary only for the driver to throw in the clutch 56 by operating the handle 57.

In Figures 4, 5 and 6 there is illustrated a device whereby the amount of water desired to be taken from the tanks 15 and 16 can be regulated according to a predetermined setting of the apparatus. The water tanks 15 and 16 are similar, so that it will be necessary to describe only one of them. Each of the tanks is filled through an inlet opening 60 provided with a cover 61. Midway between the front and rear ends of the tank 15, it is provided with a transverse channel 62, through which water can flow from the main portion of the tank into a pipe or casing 63 which extends upwardly beyond the top of the tank. The purpose of this casing or shield 63 is to avoid inaccuracies in the amount of water which can be withdrawn from the tank for any predetermined setting of the apparatus, as more fully described hereinafter. Water can be drained from the tank by opening a plug 90.

Pipes 18 extend into each of the shields 63 and are connected by a T 64 to the riser 19. The riser 19 and both of the conduits 18 are movable upwardly and downwardly as a unit relative to the bottom of the tanks 15 and 16 in order to regulate the amount of water which may be withdrawn from the tanks for any definite location of the inlet openings of the pipes 18 relative to the bottoms of the tanks. Thus, by raising the pipes 18, thereby increasing the distance between its inlet opening and the bottom of the tank, the amount of water which can be withdrawn from the tank will be decreased.

In order to regulate the position of the inlet opening 65 of the conduits 18 with respect to the bottoms of the tanks 15 and 16, the pipes 18 are secured, as indicated by the reference numeral 66, to the lower ends of racks 67. The racks 67 may be moved up and down in a guiding support 68 which is secured to the truck chassis. The racks 67 are raised and lowered by turning a crank 69 secured to a shaft 70 which has a pinion 71 fixed thereto, the shaft 70 being mounted in the support 68. The pinion 71 meshes with the left-hand rack 67, as viewed in Figure 4, and also with a pinion 72 which, in turn, meshes with the right-hand rack 67.

Rotation of the crank clockwise, as viewed in Figure 4, raises the racks 67 and, therefore, raises the inlet openings 65 of the conduits 18, thereby increasing the distance between the bottom of the tank and the inlet openings, and decreasing the amount of water which can be drawn from the tanks. Counter-clockwise rotation of the crank 69 lowers the pipes 18, thereby increasing the amount of water which can be withdrawn from the tanks 15 and 16. After the adjustment has been made by rotating the crank 69, the racks 67 are retained in the desired position by tightening a set screw 74 which contacts with the shaft 70, thereby preventing rotation of the pinions 71 and 72.

In order for the driver to know how far to raise or lower the rack 67, one of the racks carries a scale 75 which may be viewed through a window 76 provided with a magnifying glass 77. The scale 75 may be marked to indicate the distance between the inlet opening 65 of the conduit 18 and the bottom of the tank or, preferably, to indicate the number of gallons or cubic feet of water which can be withdrawn from the tanks for a predetermined setting of the racks 67.

It will be seen by referring to Figure 4 that the T 64 is located midway between the two tanks in order that there may be no tendency to pump more water from one than from the other. In order to further insure that water will be withdrawn equally from each of the tanks 15 and 16, the T 64 is provided with a baffle 80 so that the streams flowing through the conduits 18 will impinge upon it rather than upon one another. By this arrangement, it is possible to cause suction to take place from the two tanks at almost equal rates, even if the truck is not standing on a level road while the pumping is taking place. The whole apparatus is so proportioned and the rate of pumping such that the velocity with which the water is taken from the two tanks 15 and 16 is substantially equal and that, therefore, air is taken at the inlet openings 65 of the two pipes 18 at substantially the same moment.

It is not possible, however, with the mechanism by which the water is taken from the two tanks at the same time to obtain absolute accuracy by withdrawal of water from both tanks in this manner, but it is possible to reduce the inaccuracy under ordinary operating conditions to a matter of a few gallons or even a fraction of a gallon on a total of between eighty and one hundred gallons of water, so that the error for practical purposes is not of serious consequence. If, however, it is necesasry under special conditions to eliminate this source of error, which is operative only when the difference in level between the two tanks is considerable, the apparatus may be arranged so that the connection to one of the tanks only is adjustable, as by substituting an L leading to one tank only for the T 64, and connecting the other tank in such a manner that it may be pumped entirely dry before any water is taken from the tank with the adjustable connection.

Another method of eliminating inaccuracy is to introduce separate valves 85 and 86 in each of the conduits 18 between the inlet openings 65 and the riser 19. These valves are indicated in Figure 4, but under ordinary conditions are not used as sufficient accuracy for ordinary purposes may be secured when the valves always remain open or are not present at all. When the valves 85 and 86 are employed, additional accuracy may be obtained by first pumping water from only one of the tanks 15 or 16 until no more can be taken therefrom and thereafter changing the positions of the valves 85 and 86 so as to close one of the pipes 18 in order to prevent sucking in air, and to open the other pipe to the second tank in order to withdraw water therefrom. With this arrangement, the pump, being self-primed, will be able to pump each tank to the level of the bottom of the pipe, even though the two tanks be at considerable difference in elevation.

In order to insure the greatest accuracy in the amount of water withdrawn from the tanks 15 and 16, the inlet openings 65 should be directly over the geometric centers of the bottoms of the tanks. This can be accomplished by arranging the tanks so that their centers are directly under the elbows 87, or, if this is not feasible, because of the arrangement of other parts of the apparatus on the truck, an elbow can be secured to the lower ends of each of the suction pipes 18 so that the inlet openings are directly over the center of the bottom of the tanks. This arrangement is indicated in Figure 7, in which the pipe 18a corresponds to one of the pipes 18 shown in Figure 4. An elbow 88 is secured to the pipe 18a in order to bring the inlet opening 65a directly over the center of the bottom of the tank 16a.

In operating the device, the tanks 15 and 16 are filled with water and the filling openings 60 are covered. The crank 69 is then turned so as to raise or lower the pipes 18 to adjust the inlet openings 65 to a position where the desired amount of water can be drawn from the tanks. The engine 14 is started and, because of a connection (not shown) between the shaft 12 which drives the mixer 2 and the transmission gearing within the casing 13, the mixer 2 is rotated. When the operator desires to introduce water into the mixer from the nozzles 43, he simply moves the handle 57 to throw in the clutch 56 which operates the pump 21. Water is then withdrawn from the tanks 15 and 16 and is pumped into the pipe 28 and is sprayed from the nozzles. The pump will run and continue to discharge water into the mixer until air is taken at the bottom of one of the pipes 18. If conditions are such as will normally be the case, when air is taken at the bottom of one of these pipes, the water in the other tank will be approximately at the level of the inlet opening 65 in that tank, so that the error in the total quantity of water that has already been pumped is negligible for all practical purposes. The operator can shut off the pump at any time after air is taken and will have no difficulty in knowing when that time arrives because the taking of air through a unit of this kind makes a characteristic noise which the operator will hear. Should he, however, fail to shut off the pump, it will not result in an improper amount of water being introduced into the mixer, nor will it result in any damage to the apparatus because air will continue to be taken and there will no longer be any water above the inlet openings.

I have illustrated and described two embodiments of my invention. It is to be understood, however, that the invention may be otherwise embodied within the scope of the following claims.

I claim:

1. In combination with a truck mixer, a device for measuring and supplying water to the mixer, comprising a water tank, a conduit for delivering water from the tank to the mixer, said conduit having its inlet opening extending into the tank and being movable relative thereto, means for pumping water from the tank through the conduit to the mixer, said conduit being secured to a rack, means for raising and lowering the rack to adjust the position of the conduit inlet opening relative to the bottom of the tank, and a scale secured to the rack having indicia thereon to indicate the position of the inlet opening relative to the bottom of the tank or the amount of water which can be drawn from the tank at that setting of the rack.

2. In combination with a truck mixer having a water inlet, a device for measuring and supplying water to the mixer, comprising a water tank mounted on the truck chassis with the tank outlet below the water inlet of the mixer, a conduit having its inlet opening extending into the tank and being movable relative thereto, means for adjusting the position of the conduit inlet opening relative to the bottom of the tank, a pump mounted on the chassis, a flexible conduit connecting said first-mentioned conduit and pump, and another conduit for delivering water from the pump to the mixer.

3. In combination with a truck mixer, a device for measuring and supplying water to the mixer, comprising a plurality of water tanks secured to opposite sides of the truck below the mixer, a conduit extending into each tank and being movable relative thereto, a pump, each of said conduits leading to the pump, another conduit connecting the pump and mixer, and means for adjusting the position of said first-mentioned conduits relative to the bottoms of the tanks to regulate the amount of water which can be pumped from the latter.

4. In combination with a truck mixer having a water inlet, a device for measuring and supplying water to the mixer, comprising a plurality of tanks secured to opposite sides of the truck below the water inlet of the mixer, a conduit extending into each tank and being movable relative thereto, a pump, each of said conduits leading to the pump, another conduit connecting the pump and mixer, said first-mentioned conduits being secured to a rack, and means for raising and lowering the rack to adjust the position of the conduit inlet openings relative to the bottoms of the tanks.

HAROLD E. McCRERY.